United States Patent [19]

Kish

[11] 3,895,354

[45] July 15, 1975

[54] PROGRAM EDITOR FOR MACHINE CONTROL

[75] Inventor: Steven Charles Kish, Mayfield Village, Ohio

[73] Assignee: The Warner & Swasey Company, Cleveland, Ohio

[22] Filed: Aug. 31, 1973

[21] Appl. No.: 393,295

[52] U.S. Cl. .......... 340/172.5
[51] Int. Cl. .......... G06f 7/14; G06f 15/00
[58] Field of Search .......... 340/172.5

[56] References Cited

UNITED STATES PATENTS

| | | | |
|---|---|---|---|
| 3,668,653 | 6/1972 | Fair et al. | 340/172.5 |
| 3,744,031 | 7/1973 | Avery et al. | 340/172.5 |
| 3,764,986 | 10/1973 | Spademan et al. | 340/172.5 |

*Primary Examiner*—Gareth D. Shaw
*Assistant Examiner*—James D. Thomas

[57] ABSTRACT

A machine control receives programmed information, as from a perforated programmed tape, for controlling a machine, such as a turning machine. The programmed information includes blocks of machine control information with each block including at least one machine control function word, such as an X displacement command word. The programmed blocks of information are read from the programmed tape and recorded on an auxiliary recording medium, such as a magnetic cassette tape. Facilities are provided whereby an operator may insert a selected number of empty blocks on the auxiliary recording medium interposed between each recorded programmed block. The programmed and empty blocks on the auxiliary recording medium are read and visually displayed for verification and editing purposes. If the operator desires to modify the programmed data or enter new data in an empty block, he selectively operates a manual data entry system for entering the new data. The modified and/or new data is recorded on the auxiliary recording medium in place of the previously recorded data or in the selected empty block. This verified and/or modified information on the recording medium may then be employed as a substitute for the programmed tape for running the machine. Facilities are provided for preparing a new perforated programmed tape from the information on the recording medium.

13 Claims, 13 Drawing Figures

PROGRAM EDITOR FOR MACHINE CONTROL

This invention relates to the art of machine control and more particularly to improvements for verifying and/or modifying programmed information used by a machine control system for controlling operation of a machine, such as a turning machine.

The present invention is particularly applicable for use in verifying and/or editing a part program provided by a program source for use by a machine control in controlling the operation of a machine, such as a two axis turning machine. However, it is to be appreciated that the invention may be employed in other applications, such as for verifying and/or editing programmed information for controlling other machines or operations in dependence upon programmed information.

A machine tool control system typically employs a machine control circuit which receives programmed information as read by a tape reader upon a programmed tape. The programmed tape may be a multitrack perforated tape and provide blocks of information with each block providing information for a machine control cycle, such as for making a specific cut in a workpiece. The information in each block may include several machine function or command words each providing specific instructional information, such as a cutting speed or a linear operation or a machine tool departure distance. At least some of this information is utilized by an interpolator in the machine control circuit for interpolating the received information for controlling a cutting or work operation. In the art, this is known as a N/C (numerical control) machine control and, in various versions, are extensively employed in production facilities. The blocks of information on the programmed tape are conventionally referred to as the part program.

It is desirable that facilities be provided whereby an operator may verify the part program for its accuracy and/or for modifying the information to thereby obtain a verified part program or a modified part program before the program is utilized to control a machine to perform a work operation. Facilities known in the prior art have included, what may be termed as, tape verification and stand alone systems. A tape verification system generally includes circuitry whereby the information provided by the programmed tape is read and the programmed machine cut contour is visually displayed, as with a cathode ray tube or a mechanical plotter. This is similar to controlling the machine to obtain a dry run operation (without a part in the chuck) so the machine runs in accordance with the program and verification is obtained by the operator visually inspecting the manner in which the machine tool moves. In such a tape verification system then, only gross errors are detected. If a change is to be made, the operator or a programmer must punch a new programmed tape. The stand alone systems are relatively sophisticated and expensive in that they typically employ a universal editor, such as a visual display editor terminal, in conjunction with a central data processor. Such a stand alone system does not operate in conjunction with the machine control circuitry. Instead, it reads the information from the programmed tape and enters it into the core memory of the central processor. Editing is accomplished with the visual display editor terminal and facilities may be provided to obtain a new punched programmed tape.

The present invention contemplates the provision of a manual data entry system for the machine control whereby an operator is provided with facilities, such as pushbuttons or thumb wheels and the like, to manually enter data of the same nature as that recorded on the programmed tape. Some machine control circuits include such a manual data entry system. However, in the event that such circuitry is not included, it is contemplated by the invention that such circuitry be provided. The contemplated circuitry includes means by which the operator may manually enter a block of information corresponding with that in a programmed block. Preferably, the circuitry includes means by which the operator may select data for entry and which is visually displayed before it is effectively entered into the machine control. It is in this environment that the present invention provides the operator with additional facilities for verifying and/or editing a programmed tape. In this sense then, the verification and editing facilities effectively serve as a peripheral to the machine control.

It is therefore, one object of the present invention to provide improvements for verifying and editing programmed information for use in machine control wherein the verification and editing facilities effectively serve as a peripheral to the machine control to thereby effect economies in circuitry employed to perform the verification and editing functions.

It is a still further object of the present invention to provide part program verification and editing without the use of a universal editor and a central data processor, while still providing an operator with a visual display of selected programmed words obtained from a part program.

It is a still further object of the present invention to provide verification and editing of a part program for a machine control wherein the part program is recorded on an auxiliary recording medium for subsequent verification and editing, with the verified and/or edited recording medium being usable for directly running the machine as a substitute for the programmed tape and usable for providing a new programmed tape.

In accordance with one aspect of the present invention, it is contemplated that a machine control be provided for controlling the operation of a machine in accordance with programmed information obtained from a program source. The programmed information includes blocks of information with each block including at least one word. It is further contemplated that the machine control include or be modified to include a manual data entry sytem. The manual data entry system includes facilities whereby an operator may selectively enter new command words for storage by a display storage means, such as a storage register. A display operates to provide a visual representation of the word stored in the display storage means. A plurality of data word storage means, such as registers, are provided for respectively storing an associated one of a like plurality of data words. Circuitry is provided for receiving data words from a program data source including at least one block of information having at least one data word for storage in an associated one of the data word storage means. The manual data entry system also includes data entry means, such as a keyboard or a thumb wheel or the like, whereby a new data word may be entered for storage in the display storage means as well as in corresponding word storage means.

In accordance with the invention, circuitry is provided for receiving the programmed data words and recording representations thereof on an auxiliary recording medium with the recorded information having at least one data word. Editing circuitry responds to operation of the manual data entry means for modifying the data stored on the auxiliary recording medium in accordance with newly entered data words.

In accordance with a more limited aspect of the present invention, circuitry is provided whereby each data word received from the program source is temporarily stored in a word buffer in a sequence corresponding to the sequence that the words are provided from the program source. The word buffer contents are sequentially transferred a word at a time into a block buffer in dependence upon the sequence of receiving these words.

In accordance with a still further aspect of the present invention, the words are entered into the block buffer at selected locations independently of the order that the words are received from the word buffer so that when an entire block of words has been loaded into the block buffer, the words are oriented in a given sequence.

DESCRIPTION OF THE DRAWINGS

The foregoing and other objects and advantages of the invention will become more readily apparent from the following description of the preferred embodiments of the invention as taken in conjunction with the accompanying drawings which are a part hereof and wherein.

DESCRIPTION OF PREFERRED EMBODIMENTS

General Description

Figure 1:
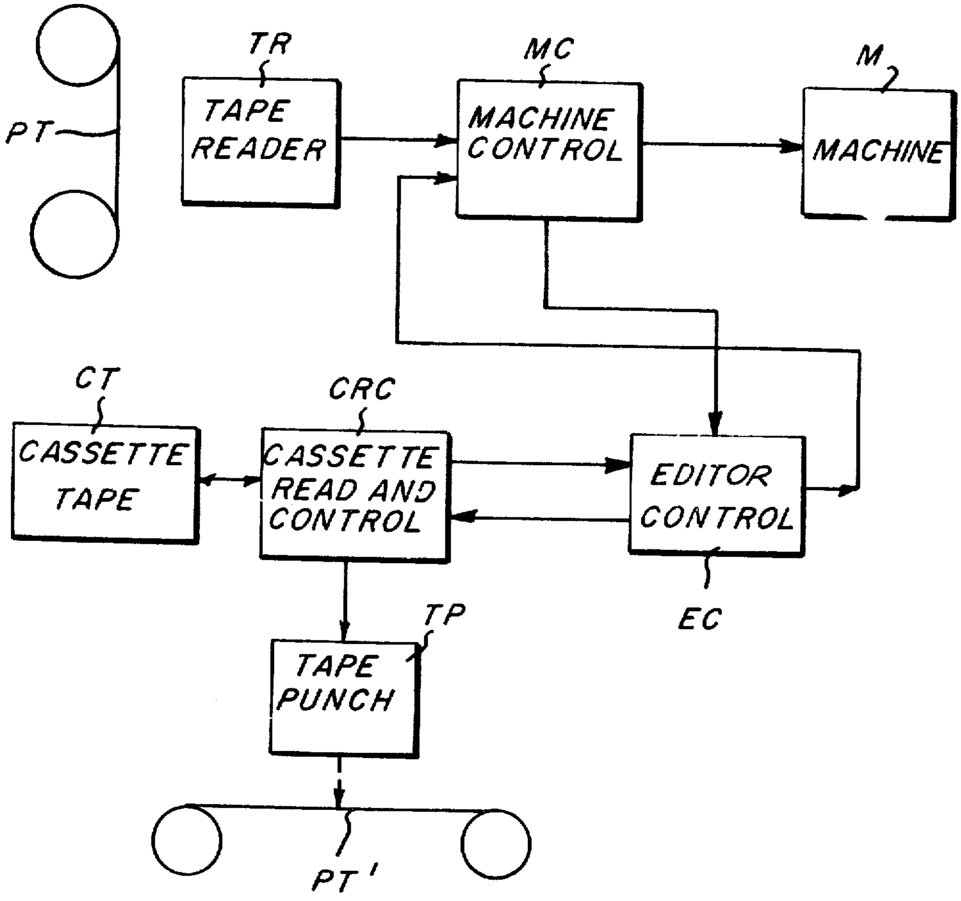
FIG. 1 is a block diagram illustration of one application of the present invention for use in conjunction with a machine control.

Referring now to the drawings wherein the showings are for purposes of illustrating preferred embodiments of the invention only and not for purposes of limiting same, FIG. 1 is a block diagram illustration of one application of the invention as applied to a machine tool control system. As illustrated in FIG. 1, a machine control circuit MC serves to control the operation of a machine M in accordance with information obtained from a programmed tape PT, as read by a tape reader TR. The programmed tape PT may take various forms but preferably takes the form of a multitrack, perforated tape which carries coded information to be read by the tape reader TR, of conventional design. It is contemplated that the program recorded on the programmed tape include blocks of information. In the application of the invention described herein, the machine M may take the form of a multiaxis turning lathe so that the programmed information includes information for various cutting operations. Each block of information may include, for example, a block number, referred to as an N word; a programmed or commanded tool velocity, referred to as an F word; a preparatory instruction command for functional operations such as linear interpolation or circular interpolation, referred to as a G word; and commanded departure distances along machine tool axes, referred to as the X word and the Z word. All of this information is not necessarily included in each block. For example, the G word may only occur in the first of a series of blocks with the machine control operating to provide a change in the G word instruction only when a new G word is programmed in a subsequent block. Also, whereas the example given above has been only for the F, G, X, and Z words, other functional and control information may be provided.

In accordance with the present invention, circuitry is provided whereby an operator may verify and/or edit the programmed tape PT. This circuitry permits the operator to search, edit, run for verification, and finally prepare a new punched tape PT' as a fully corrected new programmed tape. This is achieved with the use of an editor control circuit EC which serves to receive programmed information from the machine control MC, as read by the tape recorder TR, and records this information on an auxiliary recording medium, such as a cassette tape CT, with a cassette read and control circuit CRC. The blocks of information recorded on the cassette tape correspond with those recorded on the programmed tape except that in the editing operation, the operator has the option of adding several empty blocks on the cassette tape intermediate the data blocks. The operator may modify the information in a block which has been recorded on the cassette tape and/or add new information in the empty blocks. Once the cassette tape has been edited to the operator's satisfaction, the tape is read for purposes of controlling a tape punch TP to prepare a new perforated programmed tape PT'. If desired, the machine M may be controlled by the machine control circuit MC directly from the information on the cassette tape CT. These and other features will be described in greater detail hereinafter.

Figure 2:
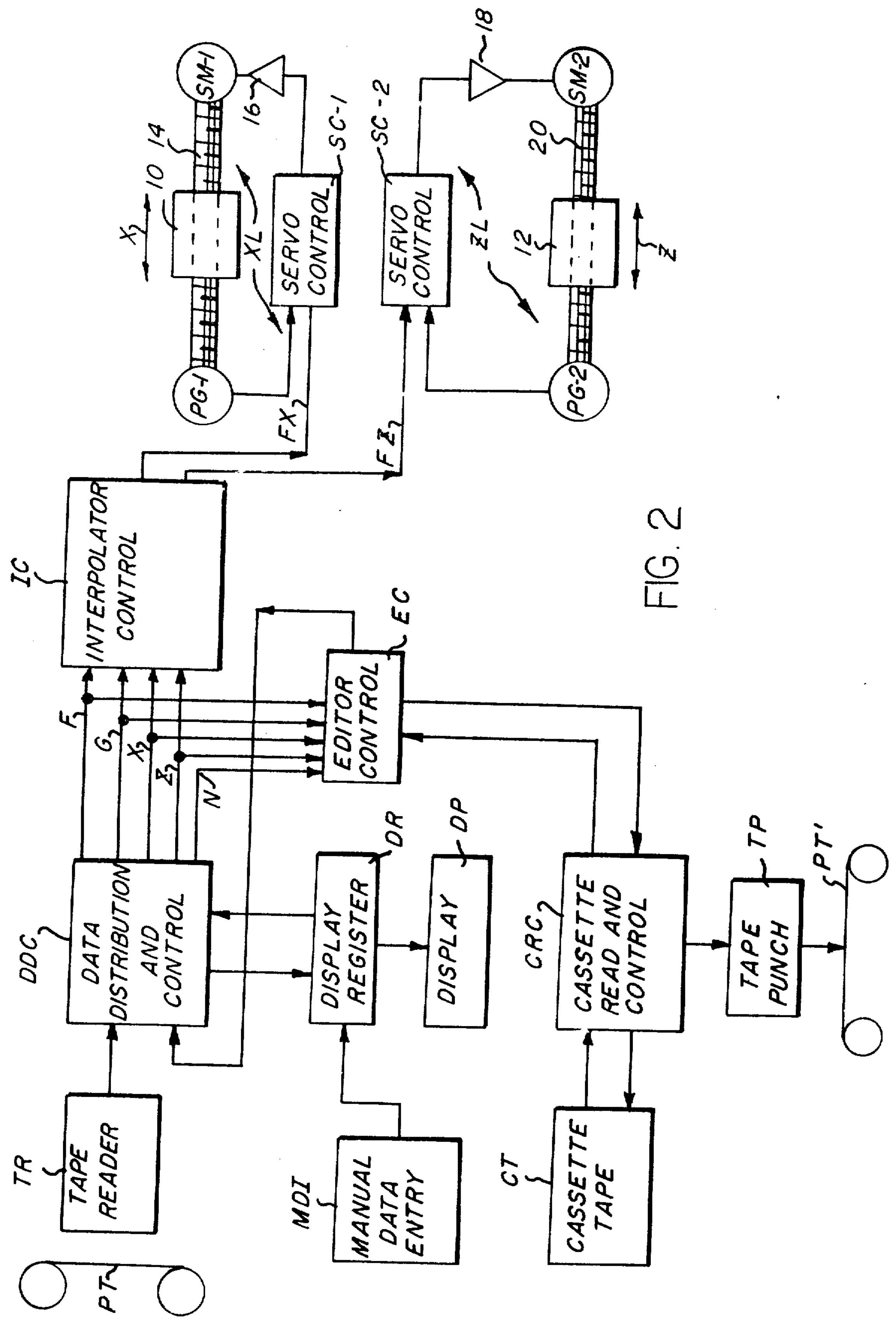
FIG. 2 is a more detailed block diagram illustration than that of FIG. 1 and showing this application of the invention in greater detail.

Reference is now made to FIG. 2 which presents a more detailed block diagram illustration of the invention as applied to a machine tool control than that as set forth in FIG. 1. For purposes of simplifying the description of the invention, like components in FIGS. 1 and 2 are identified with like character references. Here the machine control is illustrated in greater detail as including a data distribution and control circuit DDC together with an interpolator control circuit IC for controlling movement of a machine tool along mutually perpendicular axes X and Z. This is known as a two axis machine tool control system. One application for such a control system is for controlling a two axis turning machine. Whereas the invention is described in conjunction with controlling such a two axis machine, it is to be appreciated that the variously disclosed features may be employed in other applications.

In the embodiment illustrated, the F word, G word, X word, and Z word are supplied to the interpolator control IC by the data distribution and control circuit DDC for controlling movement of the machine tool. The interpolator control IC may be comprised of circuitry well known in the art although it preferably takes the form as illustrated and described in United States Patent application Ser. No. 392,684, entitled "Improved Interpolator For Machine Tool Control," filed in the name of Emmett F. Sindelar on Aug. 29, 1973 and assigned to the same assignee as the present invention. This control circuit provides command pulses $F_X$ and $F_Z$ for controlling movement of tool slides along the X and Z axes. Thus, as shown in FIG. 2, the machine to be controlled may include a cross slide 10 and a longitudinal slide 12, mounted on slide 10, for respective movement along X and Z mutually perpendicular axes. These slides are driven simultaneously in response to the command pulses received from the interpolator control circuit IC such that a cutting tool is moved along a path corresponding with the vectorial summation of movements of the slides along the X and Z axes.

As is conventional, each slide may be employed in a digital control loop. As illustrated in FIG. 2, cross slide 10 is located in a digital control loop XL which includes a servo motor SM-1 which is drivingly connected to a lead screw 14, threaded through slide 10, for purposes of driving the slide along the X axis. The velocity of movement is dependent upon the pulse rate of the command pulses $F_X$ applied to a servo control circuit SC-1. This circuit provides a digital control signal which is converted into an analog signal by means of a digital-to-analog converter 16. The digital signal provided by the servo control SC-1 represents a pulse count difference between the command pulses $F_X$ and feed back pulses obtained from a pulse generator PG-1. This pulse generator may take various forms such as a rotary pulse generator connected to the lead screw 14 so as to be driven thereby for purposes of providing a pulse train having a fixed number of output pulses for each revolution of the lead screw. For purposes of simplifying an understanding of this application of the invention, the digital control loop XL has been described only generally and reference may be made to the aforesaid U.S. application Ser. No. 392,684, entitled "Improved Interpolator For Machine Tool Control," filed in the name of Emmett F. Sindelar on Aug. 23, 1973, for a more detailed description of the circuitry and operation involved. The longitudinal slide 12, which is mounted for movement on the cross slide 10, is incorporated in a digital control loop ZL which incorporates similar circuitry to wit, a servo control circuit SC-2, an digital-to-analog converter 18, a servo motor SM-2, a lead screw 20, and a pulse generator PG-2.

In accordance with one aspect of the present invention, it is contemplated that the machine control circuit includes facilities whereby an operator may display selected blocks of information from the programmed tape PT as well as manually enter new information such as F, G, X, and Z words into the interpolator control circuitry IC. This may be accomplished with a display register which receives coded information from the data distribution and control circuit. The coded representation of a selected word, such as the F word, may be stored in a display register DR and visually displayed by means of a suitable visual display DP. New data to be entered into the control circuitry may be manually entered, as with a keyboard or thumb wheel switches employed in a manual data entry facility MDI for temporary store in the display register DR. It is further contemplated, in accordance with the invention, that if the machine control does not employ such a manual data entry system and a visual display system that such circuitry be provided for use in conjunction with the editor control EC.

As will be brought out in the detailed description which follows, the information on the programmed tape is recorded as blocks of information. The editor control circuit EC is employed by an operator for purposes of recording the information on a program tape onto the cassette tape CT together with empty blocks to be used for adding additional information. The operator may obtain a visual display of an information word in a block recorded on the cassette tape. In each case, the word being accessed is displayed with the display DP. By utilizing the manual data entry system, the information provided by one of these words may be changed. Thus, the F word might be changed from F015 to F018. On command, this changed information will be written onto the cassette tape over the former information. If additional blocks of information are needed, then the operator may access an empty block and enter new information such as F words, G words, etc., by utilizing the manual data entry system MDI. Once the edited information has been recorded on the cassette tape CT, the operator may then actuate suitable switching means to cause the cassette tape recorded information to be transferred to a new perforated programmed tape PT' with the use of the tape punch TP. If desired, the edited cassette tape may be utilized to provide a program for operating the machine by reading the information from the cassette tape and supplying it to the data distribution and control circuit DDC as a substitute for the information from a programmed perforated tape. Having now briefly described the circuitry employed in this embodiment of the invention, attention is directed to the following sections which present a detailed description of this embodiment of the invention.

EDITOR GENERAL DESCRIPTION

Figure 3:
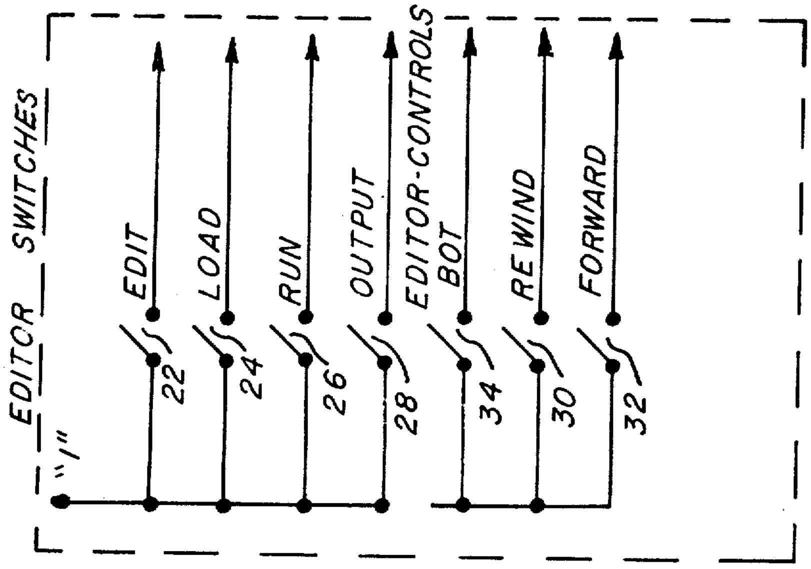
FIG. 3 is a schematic illustration of various editor control and function switches.

The embodiment of the part program editor illustrated herein, has four modes of operation; to wit, LOAD mode, EDIT mode, RUN mode, and OUTPUT mode. These modes of operation will be discussed in greater detail below. To facilitate selection of operation in one of these modes, it is contemplated that the editor control EC be provided with various manually operated mode control switches. For purposes of simplification, this is illustrated in FIG. 3 as an EDIT mode switch 22, a LOAD mode switch 24, a RUN mode switch 26, and an OUTPUT mode switch 28. In addition, it is contemplated that the editor control circuitry include various control switches such as a REWIND switch 30 and a FORWARD switch 32. Another editor control function deals with sensing the beginning of tape, BOT, and for purposes of illustration, this is simply shown in FIG. 3 as a simple normally open BOT switch 34 which upon closure provides a signal indicating that the beginning of tape on the cassette has been detected.

Figure 4:
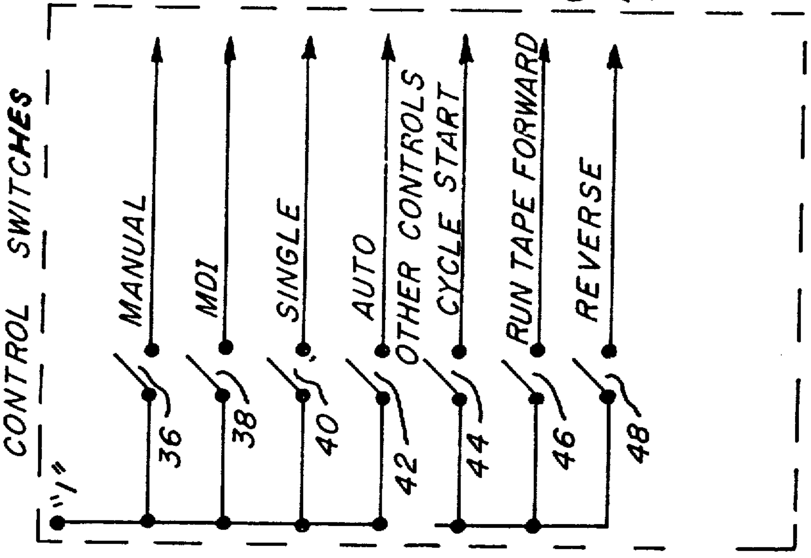
FIG. 4 is a schematic illustration of various control switches.

It is also contemplated that the control circuitry be provided with various manually operated switches and these are simply illustrated in FIG. 4 as including a MANUAL mode switch 36, MDI (Manual Data Entry) switch 38, a SINGLE mode switch 40 and an AUTO mode switch 42. Other controls that may be associated with the machine control include a CYCLE START mode switch 44, a RUN TAPE FORWARD mode switch 46, and a REVERSE mode switch 48. The specific purpose of each switch will become more apparent from the following descriptions. Before describing the specific circuitry employed in the editor control and the related circuitry, attention will now be directed to FIGS. 5–9 for purposes of presenting a general discussion of the four basic modes of editor operation.

LOAD Mode

Figure 5:
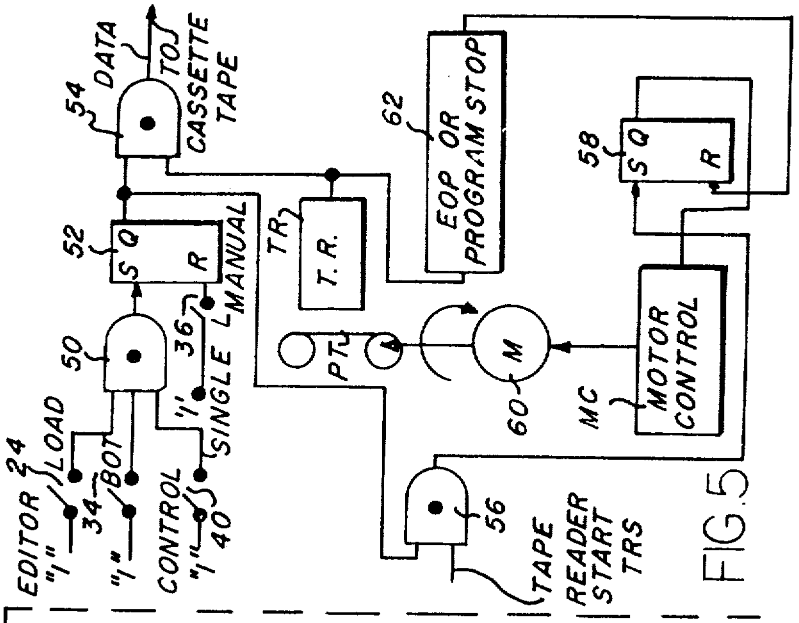
FIG. 5 is a combined schematic-block diagram illustration of circuitry employed in the LOAD mode of operation.

In the LOAD mode, the data on the programmed tape is read and recorded on the cassette tape CT. This is the first mode of operation employed when modifying a part program. This mode of operation can only be selected with the control in the SINGLE mode of operation. With reference to FIG. 5, closure of switch 40 provides a SINGLE mode. The LOAD mode is obtained by closure of switch 24. The cassette is rewound to the beginning of tape position and the programmed tape PT is rewound to the beginning of the part program. The editor senses whether the cassette is at the beginning of tape, (BOT) and if so, switch 34 is closed. Detection of these conditions may be accomplished with the use of an AND gate 50 to set a flip-flop 52, when switches 24, 34, and 40 are concurrently closed. Whe flip-flop 52 is set, it enables and AND gate 54 for passing data to the cassette tape and also enables and AND gate 56. When the tape reader start TRS signal (FIG. 11) is a logic 1, and gate 56 sets a flip-flop 58. Flip-flop 58, in turn controls a suitable motor 60 to drive the programmed tape PT in the forward direction. Data is read from the programmed tape with the tape reader TR and is passed through enabled AND gate 54 to be recorded on the cassette tape. This operation continues until the tape reader TR senses an end of program, EOP, code on the programmed tape or a program stop is detected. When this is detected by the end of program or program stop detector circuit 62, flip-flop 58 is reset to stop the tape motor 60.

Figure 6:
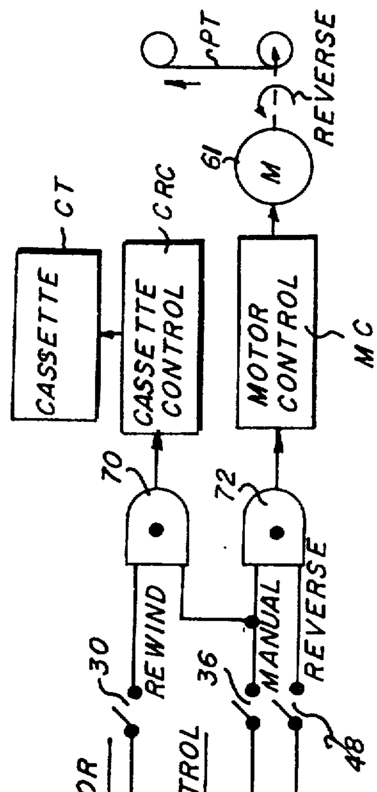
FIG. 6 is a schematic-block diagram illustration of additional circuitry employed in the LOAD mode of operation.

Once the data from the program tape has been loaded and recorded on the cassette tape, the control is placed in the MANUAL mode, as by closure of switch 36 (FIG. 6). Flip-flop 52 is reset and the cassette tape and the programmed tape are then rewound by actuation of the cassette rewind control switch 30 and the control reverse switch 48. Closure of these switches is detected by AND gates 70 and 72 which then respectively actuate the cassette control circuit CRC which rewinds the cassette tape CT. AND gate 72 actuates the motor control circuit MC which in turn operates a suitable program tape motor 61 to rewind the program tape PT.

EDIT Mode

Figure 7:
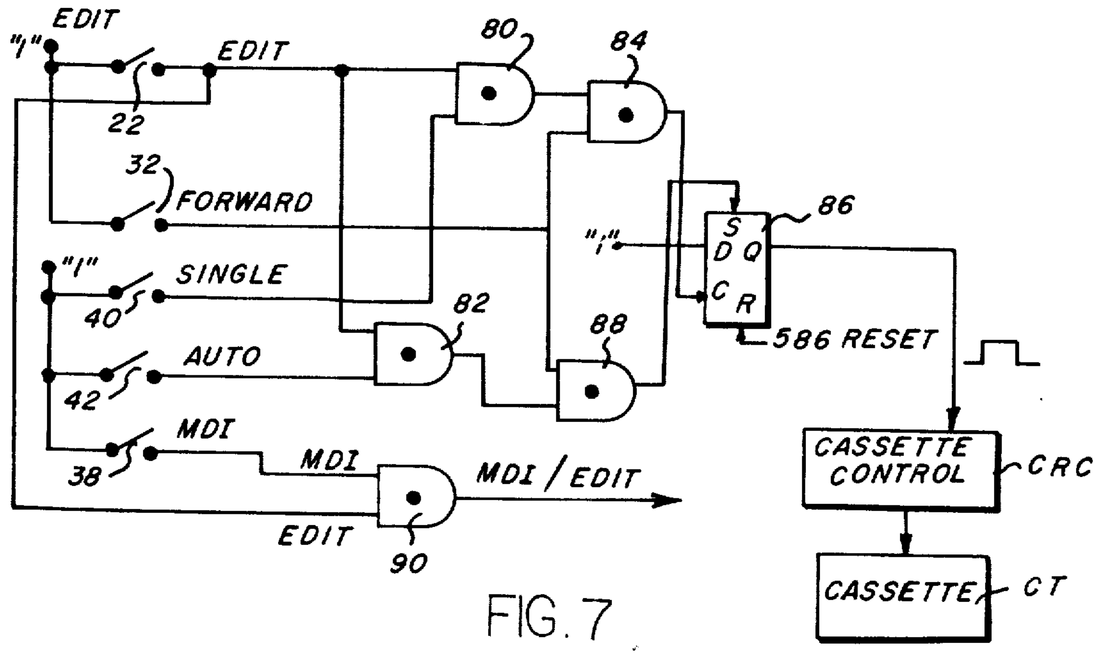
FIG. 7 is a schematic-block diagram illustration of circuitry employed in the EDIT mode of operation.

In this mode of operation, the operator is provided with facilities whereby he may verify the information on the program tape or make modifications and additions thereto. The EDIT mode operates in conjunction with either the SINGLE, AUTO, or MDI control modes. Reference should be made to FIG. 7 for an understanding of this mode of operation. Slewing of the cassette tape and reading into the control is accomplished with the editor in its EDIT mode, as by closure of EDIT mode switch 22 and by placing the control in either the SINGLE mode or AUTO mode, respectively represented by closure of SINGLE mode switch 40 or AUTO mode switch 42. The SINGLE-EDIT mode is detected as with an AND gate 80 whereas the AUTO-EDIT mode is detected as with and AND gate 82. In the SINGLE-EDIT mode, the cassette tape may be slewed in the forward direction by one cassette block distance upon actuation of the editor forward switch 32. This is detected by an AND gate 84 which then actuates flip-flop 86 to actuate the cassette control circuit CRC to run the cassette tape CT forward by one cassette block. The flip-flop is rest with a signal that determines the end of block. Continued actuation and release of the forward pushbutton 32 will incremently advance the cassette tape one block at a time. If the control is in the AUTO mode, as by closure of switch 42, then the circuitry operates in the AUTO-EDIT mode and is detected by AND gate 82. In this mode, so long as the forward pushbutton 32 is actuated, the cassette tape CT will run continuously in the forward direction. This may be implemented by an AND gate 88 which detects closure of the FORWARD mode switch 32 and the AUTO-EDIT mode. The output from AND gate 88 may be applied as a direct set signal to flip-flop 86 to control the cassette to continuously run in the forward direction so long as the forward switch 32 is closed.

In the EDIT mode, the operator may modify an existing block of data or add new blocks of data in empty block locations on the cassette tape. This is accomplished in the MDI-EDIT mode which requires closure of edit mode switch 22 and the control MDI mode switch 38. This may be detected by an AND gate 90 to provide an MDI-EDIT mode control signal for use by the editor control circuitry (to be described in detail hereinafter) to achieve an editing function. A block to be modified or an empty block to which new data is to be entered may be located when in the SINGLE-EDIT mode, i.e., when AND gate 80 detects closure of switches 22 and 40. Having located the block, the operator then operates the switches into the MDI-EDIT mode so that corrected data or new data may be entered into the selected block on the cassette tape.

RUN Mode

The RUN mode is employed for running the machine from the part program stored on the cassette tape instead of the part program stored on the program tape PT. Thus, after the operator has loaded the information from the program tape onto the cassette tape and made desired modifications, he may then run the machine directly from the modified program as recorded on the cassette tape. The RUN mode may be operated in conjunction with the control in either the SINGLE mode or AUTO mode. Thus, a SINGLE-RUN mode requires closure of RUN mode switch 26 and closure of the control SINGLE mode switch 40 (see FIG. 8). This may be detected by an AND gate 100. The AUTO-RUN mode requires closure of RUN mode switch 26 and AUTO mode switch 42. This may be detected by an AND gate 102. The part program cycle then is initiated with the CYCLE START pushbutton, as by closure of switch 44, in the AUTO mode. This may be detected by an AND gate 104 to start or initiate operation so that the cassette control and read circuit CRC reads the cassette tape CT and supplies information to the machine control. The operation may be reinitiated in the SINGLE mode upon actuation of the CYCLE START switch 44 and this is detected as with an AND gate 106. The cassette tape will rewind automatically to the beginning of the cassette tape at the completion of the part program as detected by the end of program detector circuit 62. This simulates a conventional control operation with a punched tape reader input.

OUTPUT Mode

The OUTPUT mode is used for punching out a finalized part program tape. This mode requires that the editor OUTPUT mode switch 28 be actuated and the control SINGLE mode switch 40 by actuated. This may be detected as with an AND gate 120 (see FIG. 9) to provide a SINGLE-OUTPUT mode signal. This signal is then utilized to control circuitry by which the tape punch TP (see FIG. 2) is operated to punch a new program tape PT'.

DETAILED DESCRIPTION

Machine Control

As previously described with reference to FIG. 2, it is contemplated that the machine control includes the data distribution and control circuit DDC and an interpolator control IC and that the control have facilities for manual data entry. This contemplates the provision of the manual data entry system MDI, a display register DR, and a visual display DP. If this circuitry is not provided by the machine control, then it is contemplated that such circuitry be provided for use in conjunction with the edit control EC. The description which follows with reference to FIG. 10 is specifically directed to circuitry corresponding with the manual data entry MDI, display register DR, and display DP and an associated circuitry.

Figure 10:
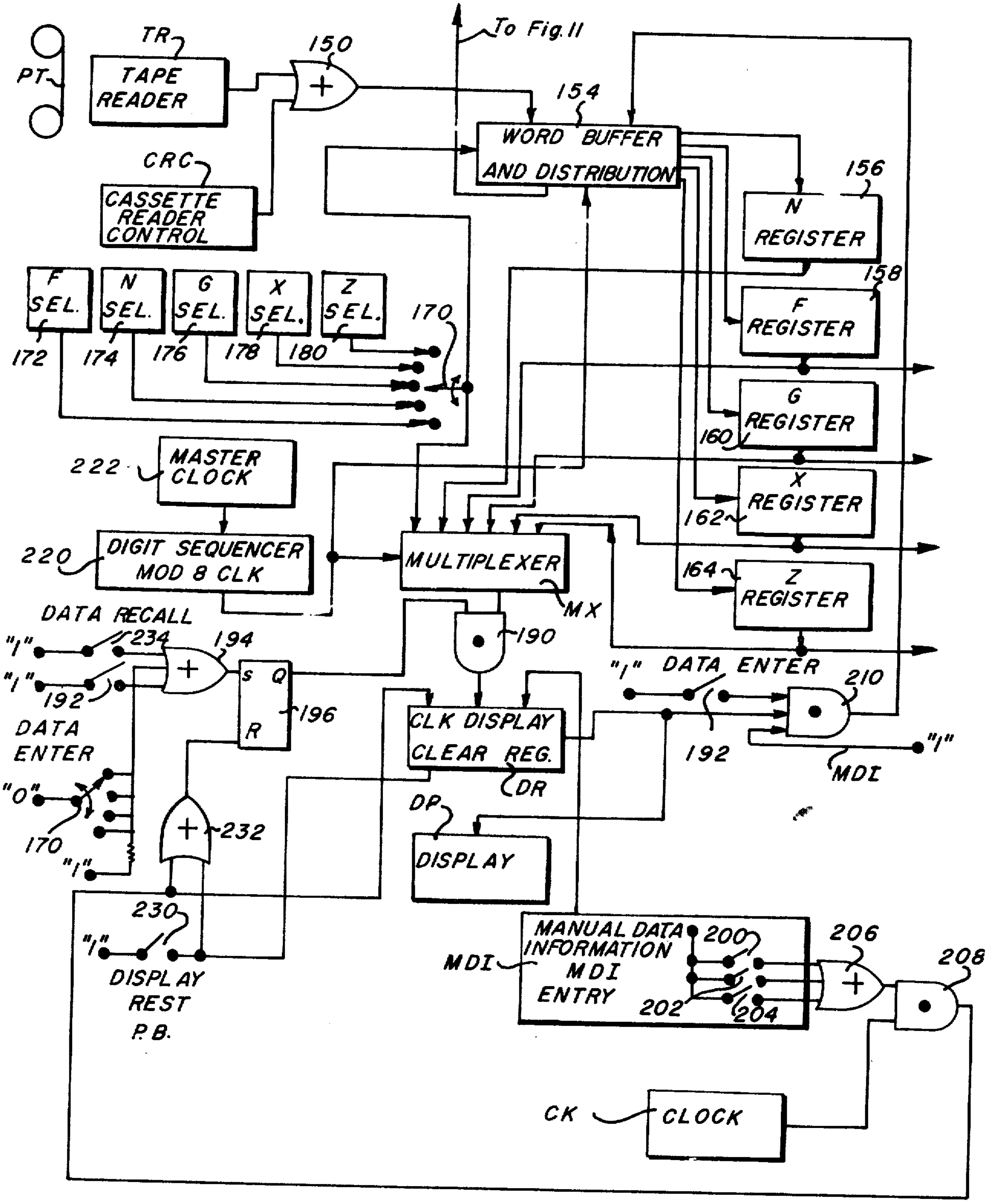
FIG. 10 is a schematic-block diagram illustration of a manual data entry system and related controls.

Reference is now made to the circuitry illustrated in FIG. 10. Data obtained from the program tape is read by tape reader TR and data obtained from the cassette is read by the cassette reader and control CRC. Data from either source is applied through an OR gate 15 to a word buffer distribution circuit 154. Each block includes an N word to identify the block number. Following the N word there may be other words such as an F word, a G word, an X word, and a Z word. For purposes of illustration, a block being read from the programmed tape may include the following information: N05, G01, X007, Z006, E01, and E0B. N word N05 indicates that the block is block number 5. The G word, G01, is a command calling for linear operation. The X word is a command representing the desired displacement along the X aris and the Z word is a command representing the desired displacement along the Z axis. The F word represents the desired vectorial velocity. The E0B word is an end of block designation. Other commands may be present but for purposes of simplifying the description of the invention, only these commands will be discussed herein. The word buffer and distribution circuit 154 may take various conventional forms for decoding and buffering and then distributing decoder information to associated storage registers. In the example given, there are five storage registers to wit: an N register 156, an F register 158, a G register 160, an X register 162, and a Z register 164. As a block of data is being read, the N word is decoded and the word buffer and distributor actuates the N register to store the block number information, i.e. 05. Preferably, although not necessarily, the N register 156 is a parallel input to parallel output register and, for example, may be constructed to store a twelve bit BCD number representative of information contained in the N word. Similarly, upon receipt of the F word, the word buffer and distribution circuit 154 decodes the fact that the F word is being received and actuates the F re ister 158 to store the information contained in the F word. In the example being given, a number is stored in the register representative of 01. The F, G, X, and Z storage registers may take various forms but preferably take the form of serial input to parallel output shift registers.

With the block data being loaded into the storage registers 156 through 164, the operator may obtain a visual display of the stored information. This is achieved with the use of a word selector switch 170 which is manually operable to select the F word register from an F word select 172 or the N word register from an N word select 174, or the G word register from a G word select 176 or the X register from an X word select 178 or the Z register from a Z word select 180. Word selects 172 through 180 may be hard wired to provide multibit binary signal patterns which, when decoded by the word buffer and distribution circuit 154 and multiplexer MX will activate the associated register 156 through 164 to output its data to the display register DR. Thus, for example, with a block of data being stored in registers 156 through 164, the operamay manipulate switch 170 to connect the N word select 174 in order to determine the information stored in the N register. With the switch 170 so positioned, it supplies an N command to the word buffer and distribution circuit 154 as well as to a multiplexer circuit MX. The word buffer and distribution circuit 154 and multiplexer MX selects the N register 156 and outputs its data through the multiplexer. The data is not transmitted through the multiplexer to display register DR unless an AND gate 190 is enabled. This occurs in response to actuation of a data enter pushbutton switch 192 or a data recall pushbutton switch 234 or when the word selector switch 170 is between positions. When one of these switches is actuated, a binary 1 signal is applied through an OR gate 194 to set a flip-flop 196. When this flip-flop is set, it enables AND gate 190 to pass the data from the selected register for temporary storage in the display register DR. Information contained in the display register is displayed with the visual display DP so that the operator may visually view the information. In a similar manner, the operator may obtain a visual display of the F word, G word, X word and Z word.

It is also contemplated that this circuitry has facilities to permit the operator to manually enter new data into the registers 156 through 164. This may be accomplished with a manual data information entry MDI, which may take the form of thumb wheel adjustable storage registers or pushbutton actuated signal sources.

It is contemplated that the information to be entered for each word be numeric information such as 007 for the F word. Consequently then, the adjustable manually operated thumb wheels or pushbuttons should provide signals such as binary coded decimal numbers for entry into the display register DR. The information stored in the display register is displayed with the visual display DP so that the operator has a visual confirmation of the data entered.

Data being entered into the diplay register is clocked and entered in parallel. The clock signal applied to the clock input of the display register is obtained in response to actuation of one of the various pushbuttons employed in the manual data entry system. For purposes of simplification, this is illustrated as including representative switches 200, 202, and 204. As a switch is actuated to enter data into the display register, a binary 1 signal is applied through one of the actuated switches 200, 202, or 204, etc. and thence through an OR gate 206 to enable an AND gate 208 to pass clock pulses from a clock source CK. Each of the clock pulse passed is applied to the clock input of the display register to clock the data into the display register from the manual data information entry system MDI. If the information displayed meets with the operator's approval, he may then enter the information so that it will be stored in the appropriate word storage register. For example, if the operator is entering data for the X word, he selects register select 178 with switch 170 and then enters into the display register the proper number, such as 009. So long as the control MDI switch 38 is closed (FIG. 4), a binary 1 signal is applied to one input of an AND gate 210. The operator may enter the data by closure of the data enter switch 192 which enables AND gate 210 to pass the information from the display register DR to the word buffer and distribution circuit 154. The information may be passed in bit serial fashion although it is preferably passed in bit parallel, digit serial, fashion with the most significant digit being passed first. Since the selector switch 170 has selected the X word, the buffer and distribution circuit 154 distributes the data from the display register DR into the X register 162 for storage. While the data is being distributed into the X register 162, it is also being clocked through the multiplexer MX and AND gate 190 to the display register DR so that it is displayed. In order to control the digit sequence so that the most significant digit is passed first, the multiplexer MX and the word buffer and distribution circuit 154 are synchronized in their operation with synchronizing pulses obtained from a digit sequencer 220 operated from a master clock source 222. The digit sequencer may take the form of a conventional modulo eight clock circuit.

The display register DR is cleared in response to actuation of a display reset pushbutton switch 230 to apply a trigger signal to the clear input of the display register. This signal is also applied through an OR gate 232 to reset flip-flop 196 and thereby disable AND gate 190. If the operator desires to recall the information previously in the display register, he may do so by actuating a data recall pushbutton switch 234. This will apply binary 1 signal through OR gate 194 to set flip-flop 196 to thereby enable AND gate 190. If the operator has not changed the position of the selector switch 170, the data from the selected word will be retrieved from the associated storage register 156 through 164 and applied through the multiplexer for storage in the display register DR and displayed with the visual display DP.

Editor Control

In the previous descriptions with reference to FIGS. 1 through 9, a brief introduction was presented as to the operation and circuitry involved in the tape editor. The references to FIGS. 3 through 9 dealt specifically with the editor and control switches as used in the four modes of operation to wit, LOAD mode EDIT mode, RUN mode, and OUTPUT mode. In the descriptions which follow, reference will be made to the specific circuitry employed, as presented in FIGS. 11 and 12, taken in conjunction with the circuits described thus far.

LOAD Mode

As discussed previously, the LOAD mode is the first mode of operation for modifying a part program from the programmed tape PT and during this mode, the information from the programmed tape PT is recorded on the cassette tape CT. To be in this mode, the operator must actuate the edit control load switch 24 (see FIG. 5) and actuate the control SINGLE mode switch 40. Both the cassette tape and the programmed tape are rewound so that the cassette tape is at its beginning of tape position, BOT, and the punched tape is located at a position preceding the first end of block, EOB. With the editor control sensing a beginning of tape BOT closed so that AND gate 50 operates to set flip-flop 52. Data from the tape is now read by the tape reader TR and supplied to the editor control circuit EC where it is recorded on the cassette tape CT.

With the tape editor being in the LOAD mode, data from the programmed tape PT is read by the tape reader TR and supplied to the word buffer and distribution circuit 154 (see FIG. 10) which then distributes data to registers 156 through 164 and supplies the data to the editor control circuit EC (see FIG. 2). In the example being given herein, each block of data is considered as having an N word, a G word, an F word, an X word and a Z word. The final word in each block is followed by an end of block word EOB. Several such blocks of information may be on the programmed tape PT with the last block involved being followed by an end of program word EOP.

Figure 11A:
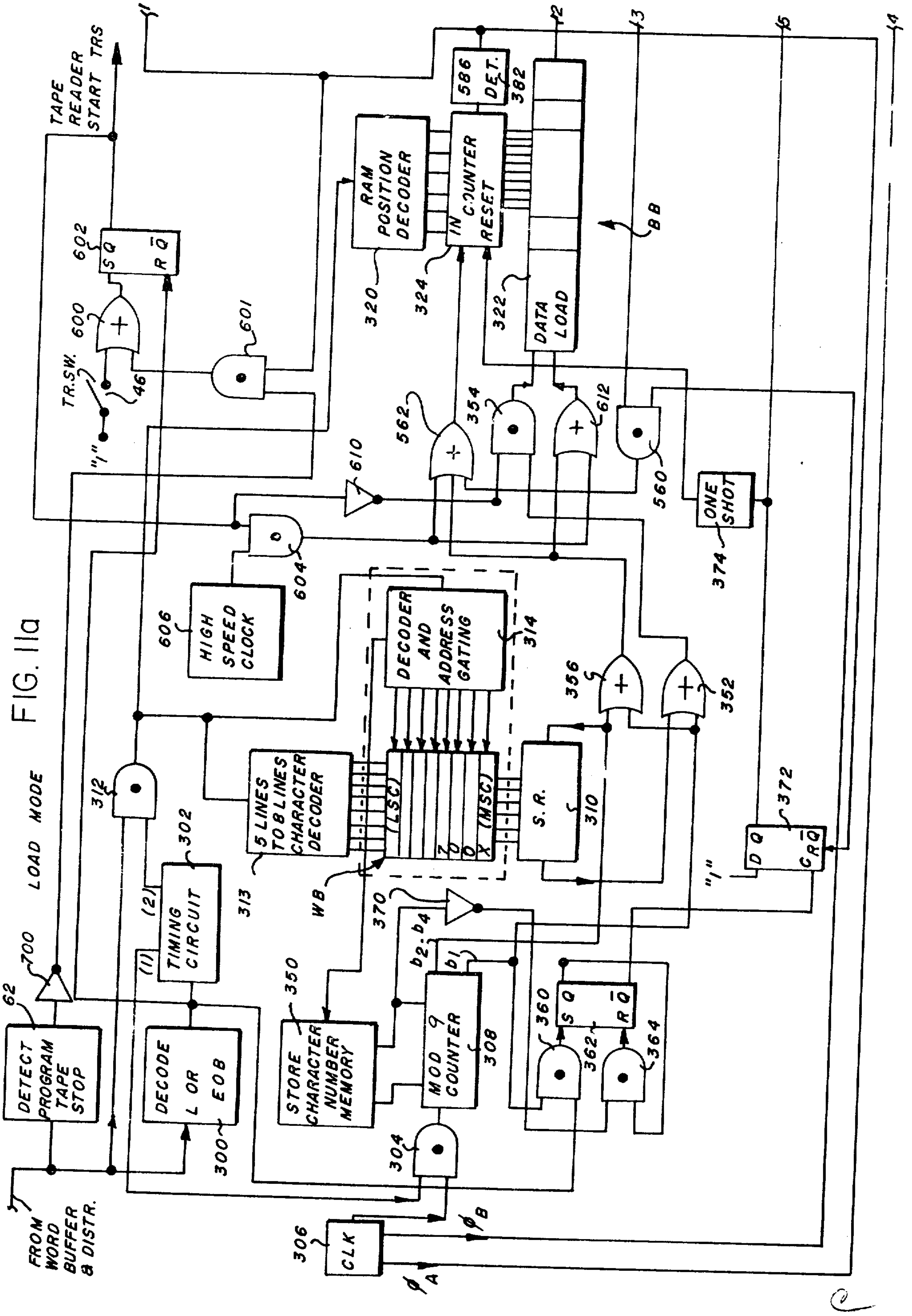
FIG. 11, comprised of FIGS. 11A and 11B taken together, is a schematic-block diagram illustration of various circuits employed in the editor control; and, FIG. 12 is a schematic-block diagram illustration of circuitry employed for reading and reconstructing data from a cassette tape.
Figure 11B:
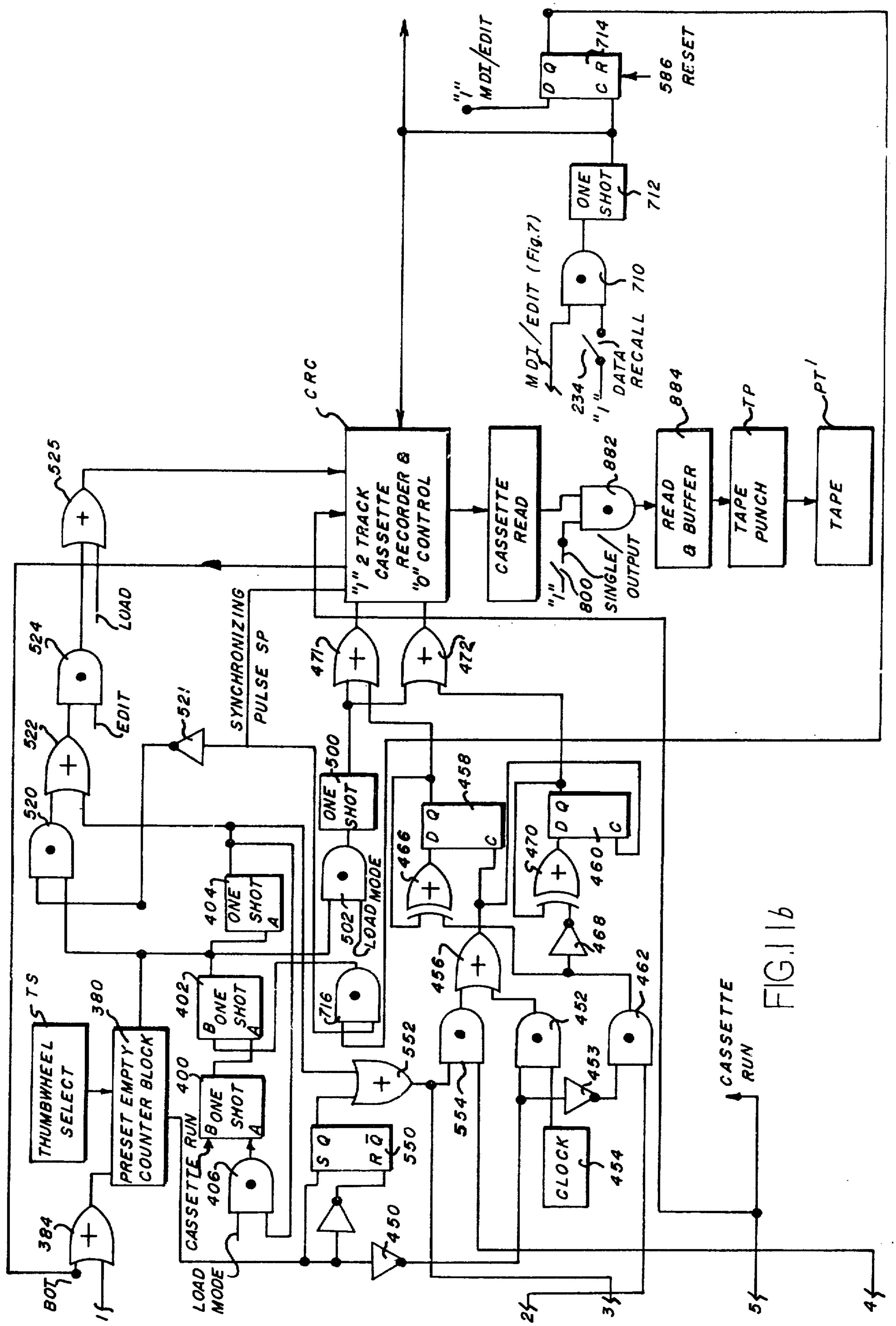

The blocks of information read by the tape reader are transmitted by the word buffer and distribution circuit 154 to the editor control circuitry of FIG. 11. As will be explained in greater detail hereinafter, the editor control circuitry includes a word buffer WB which serves to temporarily store each word from a block of information being received from the tape reader. The words in the block are then stored in specific positions in a block buffer BB and after the entire block of information has been stored in the block buffer, the information is transmitted through the cassette recorder and control CRC and recorded on the cassette tape CT. So that the operator may have sufficient flexibility to add new blocks of information, empty blocks are also recorded on the cassette tape between data blocks taken from the programmed tape PT. This is accomplished with a thumb wheel selection circuit TS by which an operator selects the number of empty blocks to be interposed between data blocks.

As data is received from the word buffer and distribution circuit 154 (FIG. 10), it is decoded by a decoder 300 in order to detect a letter code such as a code for the letter N, F, G, X, or Z, or a delete code or an end of block code. In response to detection of any of these codes, the decoder 300 applies a pulse to a timing circuit 302. This timing circuit provides two time spaced output pulses in response to receipt of a signal pulse from the decoder 300. The first pulse serves to control the shifting of previously stored data in the word buffer WB into the block buffer BB. The second pulse serves two functions; namely to strobe the letter word or an end of block word into the word buffer WB and to operate circuitry for finding the correct word start location in the block buffer BB.

The first pulse from the timing circuit 302 serves to enable an AND gate 304. This permits clock pulses from a clock source 306 to be passed by a modulo 9 counter 308. This is a conventional module counter and serves to provide a series of nine synchronizing or clock pulses for bit times $b_1$ on one line and for bit times $b_2$ through $b_9$ on a second line. The purpose of bit time $b_1$ is for providing a flag bit between adjacent characters or digits in each word. The information for each digit or character is transferred in synchronism with bit times $b_2$ through $b_9$. These synchronizing pulses $b_2$ through $b_9$ are supplied to the shift input of a parallel input to series output shift register 310 which serves to receive eight bit characters from the word buffer WB and then serially shift these characters with the most significant bit being shifted first in response to receipt of pulses $b_2$ through $b_9$. This aspect of the operation will be described in detail at a later point.

The second pulse from the timing circuit 302 serves to strobe the most significant character (MSC) in the word being received into the most significant character position o the word buffer WB. The word buffer WB may take various forms and preferably includes facilities of storing a plurality of eight bit characters. The plurality of characters to be stored corresponds with the greatest number of characters or digits employed in any word in a block of information. For purposes of illustration, we will consider that eight characters suffice with each character being stored in the word buffer in dependence upon its significance. As illustrated in FIG. 11, the most significant character, which is the letter code character for a word, is stored in the most significant character position or word line and the least significant character is stored in the least significant character position or word line.

Each character transmitted from the word buffer may take the form of a five bit code with four bits providing information, such as in the binary coded decimal format, and with one bit serving to indicate whether the data represented by the five bit code represents a letter, such as N or G, or information data. The second timing pulse from the timing circuit 302 enables and AND gate 312 to pass the five bit parallel data with the characters being transmitted in series with the most significant character being transmitted first. This information is decoded by a five line to eight line character decoder 313 and a decoder address and gating circuit 314 responds to the significance of the character to select the proper word line in the word buffer WB which the character is stored. Thus, in the example of an X word of X007, the X character is stored in the most significant character word line, the first 0 character is stored in the next to the most significant word line and so on as it illustrated in FIG. 11. When the information stored in the word buffer is outputted, it is outputted in the sequence of the most significant character first and the least significant character last so that the information is transferred in character serial fashion.

The five bit parallel, character serial, data passed by AND gate 312 is also passed to a RAM position decoder 320 which serves to decode the letter code for each word for purposes of determining the position at which the data is to be stored in a random access memory (RAM) 322 in the block buffer. It is not necessary, in accordance with the invention, that a random access memory be employed for data storage as other memories may be employed, such as a circulating shift register. However, in the embodiment illustrated, a random access memory is employed having a single bit track or word line with a plurality of bit positions, on the other of 586. The memory serves to store a block of information at a time with each word in the block being entered at a particular starting position. In the example being given, the program calls for a block with the words being in the sequence N05, G01, X007, Z006, F01, and EOB. Each of these words has a specific starting position at which the data is entered. The most significant character is entered with its most significant bit being entered first. For purposes of illustration, we will consider that the starting position for the N word is position 11 whereas the starting position for the G word is 96 and that for the X word is 137 and that for the Z word is 228 and that for the F word is 305. Assume further that in making up the program tape the programmer punched in the X word after he punched in the Z word. The RAM position decoder 320 decodes the letter code for each word and selects the associated starting position for entering the data for that word into the memory 322. For example, even though the Z word was entered in the program before the X word, the RAM position decoder will decode the fact that a Z letter preceded the Z word data information and will select the appropriate starting position, in this case, position 228. The RAM position decoder 320 presets a counter 324 in accordance with the starting position associated with the decoded letter of the word being processed. In the example of the Z word, the counter 324 is set to count condition corresponding to a count of 228. The output from the counter 324 provides an address selection of the starting location 228 at which the first bit corresponding with the most significant bit of the most significant character in the word is to be entered. The characters are entered in bit serial sequence and are obtained from the parallel load to series output shift register 310.

The information in the word buffer is shifted into the random access memory 322 as the next word in the block is being decoded. Thus as will be recalled, when the letter code of the next word is decoded by decoder 300, it actuates the timing circuit 302 which provides two time spaced pulses. The first pulse is used to shift the information from the word buffer into the block buffer.

The number of characters in a word may vary up to the maximum capacity of the word buffer WB. A character number storage memory 350 serves to store a representation of the number of characters in the word buffer. This information may be provided to the memory 350 by the decoder and address gating circuit 314 which includes circuitry for keeping track of the number of characters entered into the word buffer for each word. The character number storage memory 350 may take the form of a presettable up/down counter which is clocked to the number of characters stored in the word buffer. This controls the number of groups of nine synchronizing pulses provided by the mod 9 counter 308. Thus, in the example being given, the X word of X007 has four characters which are stored in the word buffer. The up/down counter or character memory 350 is set to a count of four to control the mod 9 counter 308 to provide only four groups synchronizing pulses $b_1$ through $b_9$. Synchronizing pulses $b_2$ through $b_9$ are applied to the shift input of the parallel load to series output shift register 310 so that the eight bit character stored therein is shifted in bit serial sequence through an OR gate 352. These data bits, corresponding with bit times $b_2$ through $b_9$, follow a flag bit at bit time $b_1$. The flag bits separate characters stored in the random access memory 322. Consequently then, for each eight bit character, nine bits are transmitted through OR gate 352 and thence through an enabled AND gate 354 to the data input terminal of the random access memory 322. The synchronizing pulses at bit times $b_1$ through $b_9$ also serve as clock pulses to clock the data into the random access memory as these pulses are applied through an OR gate 356 and thence, to the load input of the memory to shift the data into the memory, commencing at the selected start position.

The last word to be loaded, for each block, into the block buffer is the end of block code EOB. This is a single character word and hence, the preset counter character number storage memory 350 will be preset to a count of 1 so that only one group of synchronizing pulses $b_1$ through $b_9$ will be transmitted by the mod 9 counter 308. When the end of block character is decoded by decoder 300, a binary 1 signal is applied to enable an AND gate 360 to pass the first bit $b_1$ from the mod 9 counter to thereby set a flip-flop 362. When this flip-flop is set, its Q output provides a binary 1 signal to enable an AND gate 364 which is subsequently used for resetting the flip-flop. Once the end of block EOB character has been loaded into memory 322, in the same fashion as the X character was loaded in the previous description, the presettable down counter character number storage memory 350 is at a count status of zero and its output circuit provides a binary 0 signal which is inverted by an inverter 370 and passed by AND gate 364 to reset flip-flop 362. The positive going edge of the output taken from the $\overline{Q}$ output of flip-flop 362 is used to trigger a combined D type-RS flip-flop 372. This flip-flop has a D input wired to a binary 1 source so that upon application of a positive going edge to the C input, a binary 1 signal is obtained from the Q output. This binary 1 signal serves two purposes; namely a cassette run signal and a signal for resetting counter 324 to its zero count status.

When flip-flop 372 is in its set condition, a binary 1 signal obtained from its Q output terminal is applied to a one shot circuit 374 to provide a timed pulse which is applied to the reset input of counter 324 to reset this counter to a zero count status. As will be developed below, the information in memory 322 is outputted in bit serial fashion for writing data onto the cassette tape CT. This is accomplished by first presetting the counter 324 to its zero count status and then applying pulses to the counter so that it counts from its zero count status to a count status of 586 during which all of the data bits have been accessed and are outputted in bit serial fashion to be recorded on the cassette tape. However, before the data in the block buffer is transferred to the cassette tape, a preselected number of empty blocks are written onto the cassette tape in dependence upon the number of empty blocks that the operator desires to have between data blocks for use in subsequent editing operations.

The operator selects the number of empty blocks as with a suitable thumb wheel selector TS and this is used to preset an empty block down counter 380. Assume, for purposes of illustration, that the operator has selected a count of 3 to command that three empty blocks be provided between each data block obtained from the programmed tape PT. The presettable down counter 380 is set with an initial count of 3. Three empty blocks, each corresponding in length with 586 bits, will be written onto the cassette tape prior to transferring the information in the block buffer to the cassette tape. From the previous operation, the counter 324 was clocked from a count of zero to a count of 586. A count detector 382 detected this condition and provided an output pulse which is supplied through an OR gate 384 to provide a load pulse to counter 380 so that the empty block number i.e. a count of 3, is entered into the down counter 380. This counter is counted down by pulses obtained from a preblock time one shot circuit 402, to be described below.

In writing data onto the cassette tape, it is desirable that circuitry be provided whereby sufficient time is provided for the cassette tape to be brought up to speed and then run for a time sufficient to record either an empty block or a data block from the block buffer BB. This is accomplished with circuitry including three one shot circuits 400, 402, and 404. These one shot circuits are connected in series as shown in FIG. 11 with the output of one shot 400 being used to trigger one shot 402 and the output of one shot 402 being used to trigger one shot 404. Each one shot circuit has a B input and an A input and the output from each one shot is a positive pulse of a given duration. The output from one shot 400 is a positive pulse of, for example, 40 milliseconds and its lagging or negative going edge is used to trigger one shot 402 to provide a preblock timed pulse of, for example, 2 milliseconds in duration. The negative edge of the output pulse taken from one shot 402 is used to trigger one shot 404 which provides an output pulse having a time duration on the order of 150 milliseconds. The time duration provided by the output pulse from one shot 404 is referred to as the block time and serves as a time period during which an empty block or a data block from the block buffer is written onto the cassette tape. The time period provided by one shot 400 serves as a time period during which the cassette tape is permitted to run up to its proper speed for recording. The time period provided by one shot 402 serves as a preblock time during which control pulses are applied to various circuits, such as the down counter 380. During each cycle of operation, one shot circuit 402 provides a pulse to count the counter 380 down by one count. One shot 400 is initially triggered by a positive pulse applied to its B input upon receipt of a cassette run signal obtained from the Q output of flip-flop 372. So long as the circuitry is in the LOAD mode (see FIG. 5 and the associated description), an AND gate 406 is enabled. This permits the negative going edge of the output pulse from one shot 404 to trigger one shot 400 so that the cycle of a start time, preblock time, and block time is repeated until the LOAD mode condition is terminated.

As stated above, the first operation that takes place in loading data into the cassette tape is the writing of empty blocks. This is followed by transferring the data from the block buffer to the cassette tape. In the example given above, a count of 3 has been preset into the down counter 380 so that for three empty blocks, each being 586 bits and recorded as binary 0 signals, are written onto the cassette tape. So long as the counter 380 is at a count status greater than zero, its output carries a binary 0 signal. This is inverted by an inverter 450 to enable an AND gate 452. This permits clock pulses from a fast clock source 454 to be passed by AND gate 452 and thence through an OR gate 456 to the C inputs of flip-flop 458 and 460. The data to be applied to these flip-flops is obtained from AND gate 462 which disabled during the writing of empty blocks by inverter 453. The output from AND gate 462 is applied to one input of an exclusive OR gate 466 and through an inverter 468 to the input of another exclusive OR gate 470. The output taken from the Q terminal of flip-flop 458 is applied to a second input of exclusive OR gate 466 whereas the output from the Q terminal of flip-flop 460 is applied to a second input of exclusive OR gate 470. Since AND gate 462 is disabled, each clock pulse from the fast clock 454 only produces transitions at the output of flip-flop 460.

The output taken from the Q terminal of flip-flop 458 is applied through an OR gate 471 to the one's data input of a two track cassette recorder control circuit CRC whereas the output taken from the Q terminal of flip-flop 460 is applied through OR gate 472 to the zero's input of the two track cassette recorder. The control circuit is conventional in the art and preferably is of the type which records a two track none return to zero (NRZ) format on a magnetic cassette tape. Such a recorder has a one's input and a zero's input for receiving one's data and zero's data. The first information recorded for each block may take the form of a binary 1 signal on each track serving as a start of block indication. This is obtained from a synchronizing pulse obtained from a one shot circuit 500 when an AND gate 502 is enabled furing the LOAD mode. Each time the preblock time one shot 402 provides an output pulse, this pulse is passed by enabled AND gate 502 to actuate the one shot circuit 500 to provide the synchronizing pulse. This is a binary 1 signal and is supplied through both the one's data OR gate 470 and the zero's data OR gate 472 so that a binary 1 signal is recorded at the same track position on both tracks of the dual track cassette tape CT. During the time that empty blocks are written onto the cassette tape, output pulses are applied through only OR gate 472 to zero's input of the cassette recorder and control circuit CRC so that only logic 0 signals are recorded on the two tracks during the 150 millisecond block time.

The cassette recorder control circuit is activated to its write condition when its write line is activated by a binary 1 signal. This takes place in the EDIT mode or in the LOAD mode. During the EDIT mode, a synchronizing pulse SP obtained from the cassette control is applied to one input of an AND gate 520 through inverter 521. This may take place concurrently with a somewhat longer duration perblock time pulse obtained from one shot circuit 402 which is also applied to AND gate 520. After the synch pulse SP and during the preblock time, a binary 1 signal is applied by AND gate 520 through OR gate 522 and through AND gate 524, when enabled during the EDIT mode, to apply a binary 1 signal through OR gate 525 to the write line of the cassette recorder and control circuit CRC. In the EDIT mode, the write line is also raised during the block time since one shot circuit 404 applies a binary 1 signal through OR gate 522 and AND gate 524. During the LOAD mode, the write line is raised by a binary 1 signal passed through OR gate 525.

Once the empty blocks have been recorded on the cassette tape, the preset empty block counter 380 will have a count condition of zero and will provide a binary 1 signal on its output circuit. This is employed to set a flip-flop 550 so that a binary 1 signal is applied through an OR gate 552 to enable a write cassette AND gate 554.

Since AND gate 462 is enabled, it will now pass the output data from the block buffer into the one's data OR gate 471 and the zero's data OR gate 472. Counter 324 is pulsed from a zero count status to a count of 586 by clock pulses obtained from a clock source 306. This clock source provides two trains of clock pulses, $\phi_A$ and $\phi_B$. These are of the same frequency but the clock pulses $\phi_B$ lag those of pulses $\phi_A$ by 180°. The $\phi_B$ clock pulses are applied through an AND gate 560 which is enabled from the output of the write cassette OR gate 552. These $\phi_B$ clock pulses are applied through AND gate 560 and thence through an OR gate 562 to the count input of counter 324. The counter will now commence to count up from a count condition of 0 to a count condition of 586. As the counter counts, it will address the random access memory 322. Thus, in the example given before, when the counter is at a count status of 228, it is addressing the start position of the Z word so that at this count condition, the most significant bit of the most significant character in the Z word is provided on the output circuit of the memory so that it may be passed through enabled AND gate 462. The words in the memory are outputted in accordance with the position number associated with each word and each word is presented in bit serial sequence such that the most significant bit of the most significant character is presented first. Consequently then, each $\phi_B$ clock pulse serves to update the counter to access an associated data bit. This data bit is then passed by AND gate 462 to the exclusive OR gates 466 and 470. The data bit is not transferred to flip-flop 458 and 460 until a $\phi_A$ clock pluse is applied through enabled AND gate 554 and thence through OR gate 456 to the C inputs of each of these flip-flops.

As described previously, the one's data is obtained from flip-flop 458 and the zero's data is obtained from flip-flop 460 and their outputs are respectively passed by OR gates 470 and 472 to the one's input and the zero's input of the cassette recorder and control circuit CRC. This operation of transferring the data from the block buffer to the cassette recorder takes place only during a block time as determined by one shot circuit 404. After the data in the block buffer has been recorded on the cassette tape, the detector 382 detects a count condition of count 586 at counter 324. The detector provides an output pulse which is passed through OR gate 384 to load the preset counter 38 to the count condition as set by the empty blocks thumb wheel selector switch TS. This will disable AND gate 462 to prevent data from being passed from the block buffer.

This binary 1 pulse from the 586 count detector 382 is also applied to an OR gate 600 through an AND gate 601 to set a flip-flop 602. The AND gate 601 disables continuation of the load sequence if a program stop or end-of-program has been detected. When flip-flop 602 is in its set condition, it enables an AND gate 604 to pass pulses from a high speed clock source 606 through OR gate 562 to the count input of counter 324. The binary 1 signal applied by flip-flop 602 to AND gate 604 is also inverted by an inverter 610 to disable the data input AND gate 354. The high speed clock pulses from clock source 606 are then passed through an OR gate 612 to the load input of memory 322. Consequently, for each clock pulse applied to the load input, a binary 0 signal is applied to the data input from the disabled AND gate 354. All bit positions of the RAM will be rewritten as a binary 0 signal to effectively reset the memory. Flip-flop 602 may be reset in various ways so that this operation does not unnecessarily continue. Once all bit positions have been written as a binary 0 signal, flip-flop 602 is reset by a pulse from decoder 300 when the decoder detects the next character letter read from the tape reader which was restarted by the Q output terminal of flip-flop 602.

When the 586 count detector 382 detects a 586 count condition of counter 324, it also provides an output pulse to reset flip-flop 372 to remove the cassette run forward signal. Consequently, the cassette recorder and control circuit CRC is in a stop condition. This takes place after the data in the block buffer BB has been transferred to the cassette tape and the counter has counted up to a count of 586. Flip-flop 372 will not be set again until after the end of block character for the next block has been loaded into the word buffer WB in the manner described hereinbefore. Once this occurs, the cassette run signal will again be provided to signal the cassette recorder and control to run forward. At the same time, one shot circuit 374 will apply a reset pulse to reset counter 324 to a zero count status. The data that has been loaded during the interum period may now be accessed for loading onto the cassette tape.

The load cycle is terminated by the end of program or program stop detector 62 (see FIGS. 5 and 11). The program stop detector 58 will disable the LOAD mode operation by applying a binary 1 signal which is inverted by an inverter 700. This disables AND gate 601 to discontinue the load sequence which can only be reinitiated by the tape reader forward switch 46. When the total program has been loaded onto the cassette, switching into the manual mode will clear flip-flop 52 (see FIG. 5) and the load mode. This will lower the write line to the cassette recorder and control circuit CRC and also disables AND gate 406 to prevent repeated cycles of the one shot circuits 400, 402, and 404. Lowering of the LOAD mode signal also disables AND gate 502 to prevent one shot circuit 500 from supplying the synchronizing pulses to OR gates 471 and 472.

At the completion of this load cycle, the control is switched into the MANUAL mode (see FIG. 6). That is, the editor rewind switch 30, the control manual switch 36 and the reverse switch 48 are all closed so that the cassette tape CT and the program tape PT are rewound.

EDIT Mode

This mode of operation was described herein with reference to FIG. 7 insofar as the editor and control switches are concerned. From that description it will be recalled that the cassette tape is slewed in the forward direction one block at a time for each actuation of the forward pushbutton switch 32 when the control is in the SINGLE mode. Alternatively, the cassette tape will run continuously with the cassette forward pushbutton switch 32 closed if the control is in the AUTO mode. As the cassette tape is driven in the forward direction either one block at a time in the EDIT/SINGLE mode of continuously in the EDIT/AUTO mode, the blocks recorded on the cassette tape are supplied to the machine control circuit (see FIG. 10).

If modification is to be made to existing block data or if new data is to be added in the empty block, the operator will utilize the MDI-EDIT mode. A block to be modified may be located in the SINGLE-EDIT mode (FIG. 7), by slewing the cassette tape forward one block at a time. In this mode, each block of data obtained from the cassette reader control CRC is supplied through OR gate 150 (FIG. 10), to the word buffer and distribution circuit 154 and thence, into the cassette editor circuitry (FIG. 11). Each block of data is loaded into the block buffer BB in the manner described hereinbefore.

For purposes of illustration, we will assume that the operator has slewed the tape forward so that the X word is displayed by manipulating selector switch 170 (FIG. 10), to the X register select circuit 178. This will cause the X word stored in register 162 from the last block read from the cassette into the control to be displayed by the visual display DP. The X word may, for example, be X007. The display will provide a visual display of the number 007, providing AND gate 190 has been enabled by flip-flop 196. Flip-flop 196 is also set to enable AND gate 190 when selector switch 170 is between letter select positions. This may be accomplished by actuating the data recall pushbutton 234. If the operator desires to make a change, as from 007 and 009, then the X letter and the associated data are cleared from the editor block buffer BB by actuating the display reset pushbutton switch 230, which serves to clear the display register DR, and by concurrently actuating the data enter pushbutton switch 192. In this operation, the data enter pushbutton switch should be released before the display reset pushbutton switch 230. In this way, the zero data in the cleared register DR is transmitted through AND gate 210 and thence, through buffer 154 to the editor control circuitry of FIG. 11. The operator may now change the X word from X007 to X009. The selector switch 170 is connected to the X word select 178 (FIG. 10) and the operator manipulates the data information entry switches MDI to enter the information 009. This is displayed by the visual display DP. If the operator is satisfied with the changed information, he may actuate the data enter pushbutton switch 192 to cause the new data to be passed by AND gate 210 and, thence, through the word buffer and distribution circuit 154 which serves to load the X register 162 with the new data as well as to route the new X word to the editor control circuitry (FIG. 11). The X word is received and stored in the word buffer WB and loaded into the block buffer in the manner decribed hereinbefore. The operator makes whatever additional changes in the various words in this block the same manner.

The operator may also slew the cassette tape forward in the MDI/SINGLE mode to access an empty block. If desired, new data information may be entered in the empty block by actuating the manual data entry switches MDI and the data enter pushbutton switch 192 in conjunction with the word code selector switch 170.

Once an old block of information has been modified or a new block has been entered for storage in the block buffer BB, the operator actuates the data recall pushbutton switch 234. When switch 234 is closed in the MDI-EDIT mode (see FIG. 11), AND gate 710 applies a binary 1 signal to a one shot circuit 712. The one shot circuit 712 provides a negative output pulse having a time duration on the order of 150 milliseconds which is employed for purposes of controlling movement of the cassette tape in the reverse direction. This signal is applied to the two track cassette recorder and control circuit CRC which drives the cassette tape in the reverse direction for 150 milliseconds. This time duration is chosen so that the reverse movement returns the cassette tape to a location just prior to the start of block location on the tape for the cassette block that to be modified. The positive going edge of this pulse is applied to the C input of a combined D type RS flip-flop 714. The binary 1 signal is applied to the D input of this flip-flop during the MDI-EDIT mode. Consequently, upon receipt of this pulse, flip-flop 714 is triggered to its set condition and provides an output signal commanding the cassette to move in a forward direction. This output signal is applied as a binary 1 signal to an AND gate 716. This enables the AND gate to pass the start of block or synchronizing pulse read from the cassette tape to actuate the preblock time one shot circuit 402. As will be recalled, the one shot circuit 402 then actuates the block time one shot circuit 404 which allocates a recording time duration of approximately 150 milliseconds during which the data in the block buffer BB is written onto the cassette tape. After the new block has been written onto the cassette tape and the counter 324 has counted to a count status of 586, the 586 count detector 382 provides a binary 1 signal which, in addition to resetting circuitry discussed hereinbefore, is also employed to reset flip-flop 714.

Cassette Read Operation

In reading data from the cassette tape CT, the dual track information must be reconstructed from the one's and zero's tracks of the cassette tape. This is accomplished with the circuitry illustrated in FIG. 12. When the cassette reader and control circuit CRC is reading the cassette tape CT, it provides a two track outout corresponding with the one's output and the zero's output. The one's output is applied to the set input of a flip-flop 800 whereas the zero's output is applied to the reset input of this flip-flop. The reconstructed data is obtained from the Q terminal of the flip-flop. The synchronizing pulse is reconstructed from detecting concurrent occurrence of a one signal on both tracks by means of an AND gate 802. This synchronizing pulse may be used to reset the block buffer counter 324 (see FIG. 11), through an inverter 804 and OR gate 806 during the process of reading from the cassette tape and loading a cassette recorded block of information into the block buffer. Clock pulses for the load input of the block buffer and the clock input of the counter 324 may be obtained from the non-return to zero pattern of ones and zeros recorded on the two tracks as with an OR gate 810. These pulses obtained from OR gate 810 may be used to trigger a one shot circuit 812 to actuate the load input of the block buffer. Counter 324 is counted up by the output pulses taken from the OR gate 810 and the reconstructed data obtained from the Q terminal of flip-flop 800 is applied through an OR gate 816 to the data input of memory 322.

In addition to reading from the cassette to load data into the block buffer 322, data may also be read from the cassette for purposes of running the machine tool from the cassette tape instead of from the program tape. This is the RUN mode which has been described hereinbefore with reference to FIG. 8.

When data is taken from the cassette tape and used to run the machine, the data must be reconstructed. This is accomplished with the circuitry discussed immediately above. In addition, this data must be presented to the machine control in the same sense as data taken from the program tape. For purposes of illustration, we will assume that the data on the program tape as read by the tape reader includes eight bit information words. The data on the cassette tape is provided as nine bit words with eight bits serving as information and one bit serving as a flag bit. Circuitry is provided to separate the flag bit so that each bit word may be presented to the data distribution and control circuit DDC in the same sense as each eight bit word taken from the tape reader from the program tape. This is achieved with the circuitry illustrated in FIG. 12.

The reconstructed data from flip-flop 800 is applied to the J input terminal of a clocked type JK flip-flop 840 as well as to the data input of an eight bit shift register 842. The reconstructed synchronizing pulse obtained from the one's and zero's track is applied as a load input pulse to the load input of a nine bit shift register 844. This shift register is employed for purposes of separating the eight data bits $b_2$ through $b_9$ and has its next to the most significant bit position prewired to a binary 1 source and its other bit positions prewired to a binary 0 source. The output from this shift register is recirculated to the input of the shift register in bit serial fashion. Each time a synch pulse SP is applied to the load input, the shift register is preset in accordance with the wired inputs. The information is shifted in bit serial fashion in synchronism with pulses applied to the clock input. These clock pulses are the reconstructed clock pulses from OR gate 810. These clock pulses are also applied to one input of an AND gate 850. The output of register 844 is also applied to the clock or C input of flip-flop 840 as well as through an inverter 852 to the clear input of a four stage counter 854. The reconstructed data from the Q terminal of flip-flop 800 is also inverted and applied to the K terminal of flip-flop 840 through an inverter 856. The bit train recirculated from the output to the input of the nine bit shift register is also inverted by an inverter 858 and applied to the other input of AND gate 850.

When the cassette read and control circuit CRC reads data from the cassette tape, a start of block designation is obtained once a binary 1 signal is concurrently detected on both tracks. This is indicated by the synchronizing pulse obtained from AND gate 802. This causes the prewired information to be loaded into the sift register 844. Once data is read from the cassette tape, clock pulses are applied to the clock input of the shift register 844 to cause the nine bit information to be recirculated. The first data pulse used as a clock corresponds with bit $b_1$ or the flag bit. Consequently then, the first clock pulse applied to the shift register 844 causes a binary 1 signal to be located in the most significant bit position of the shift register. This bit position is accessable at the data output circuit and hence, a binary 1 signal is applied to the C or clock input of flip-flop 840 as well as being inverted by inverter 858 to disable AND gate 850. Consequently then, the reconstructed clock pulse applied to AND gate 850 will not be passed by the AND gate as a clock pulse to the eight bit shift register 842 or to the clock input of the four stage counter 854. As the data in the shift register 844 is being recirculated, the remaining eight bits will all be binary 0 level signals. Each of these is inverted by inverter 858 to enable AND gate 850 to supply a clock pulse to the clock input of shift register 842 as well as to the clock input of the four stage counter 854. These next eight pulses correspond with bits $b_2$ through $b_9$, which correspond with the information data bits in a character. Since bit $b_2$ corresponds with the most significant data bit and bit $b_9$ corresponds with the least significant data bit, the data is shifted into the eight bit shift register 842 with the most significant bit first.

Figure 12:
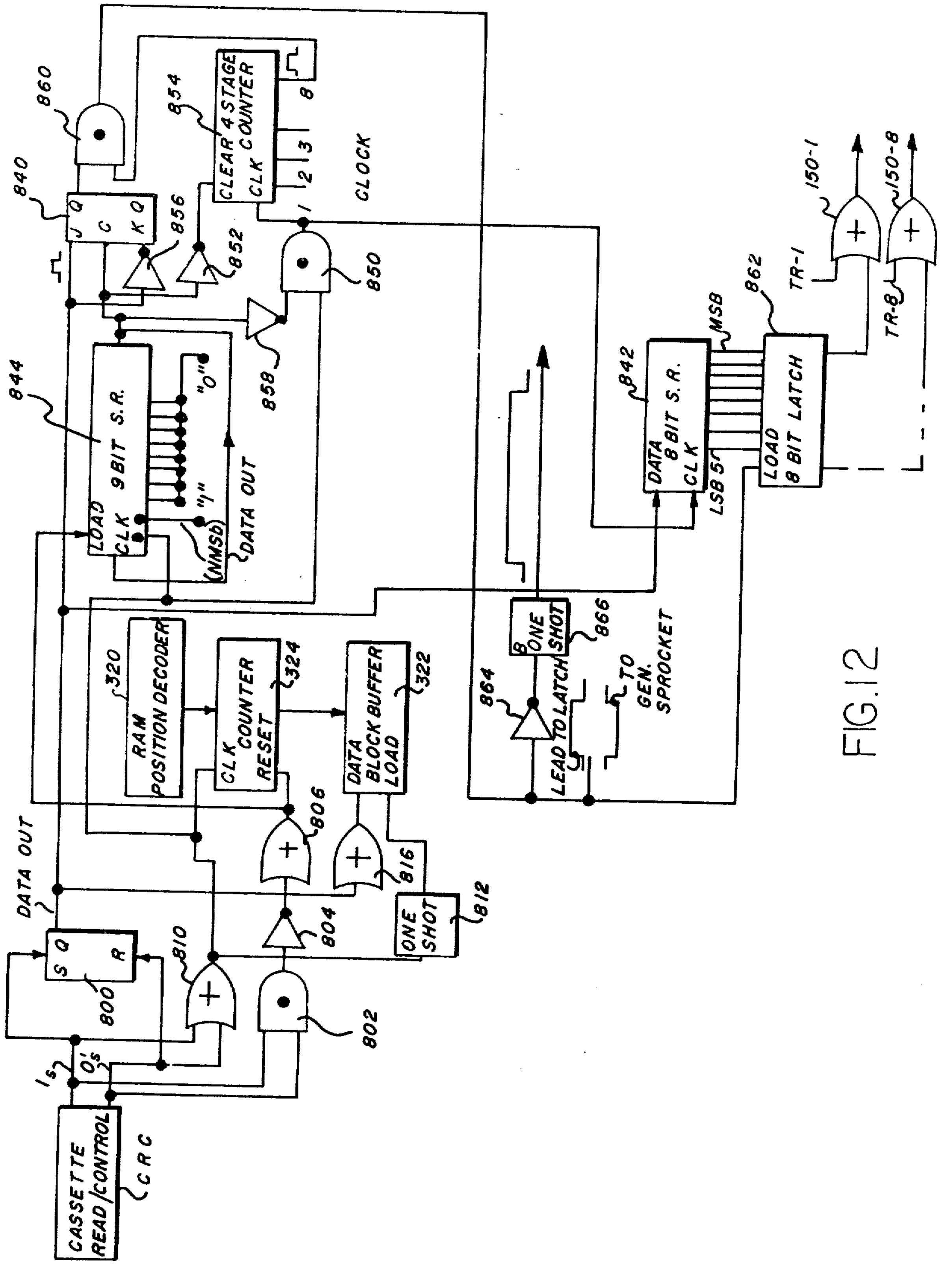

The first data out bit from flip-flop 800 is a flag bit. If it is a binary 1, the J input to flip-flop 840 will be enabled. At this point, the output from the shift register 844 will be a binary 1 signal to trigger flip-flop 840 to enable AND gate 860. Subsequently, the four stage counter 854 has counted bits $b_2$ through $b_9$and provided an output pulse which is applied to the other input of AND gate 860. Since both inputs of AND gate 860 are satisfied, a load pulse is now applied to the load input of a parallel input to parallel output, eight bit latch register 862. This permits the eight bits stored in shift register 842 to be loaded into register 862. The output from AND gate 860 may also be employed for purposes of providing a sprocket indication by inverting the signal with an inverter 864 and actuating a one shot circuit 866 to provide a timed output sprocket signal. The eight bit information located in the eight bit latch circuit may now be applied as a substitute for the eight bit program tape information to the data distribution and control circuit DDC. Thus, considering FIGS. 10 and 12 simultaneously, the tape reader TR and the cassette reader control CRC provide outputs which are applied through an OR gate 150 and thence to the word buffer and distribution circuit 154. Since the information is transmitted in parallel and not serial, OR gate 150 may be considered as a plurality of OR gates 150-1 through 150-8 for the eight bit data information. This is illustrated in FIG. 12 wherein the most significant bit position of register 862 is applied to one input of OR gate 150-1 and the least significant bit position of the register 862 is applied to one input of an OR gate 150-8. As indicated in the drawing, a second input to OR gate 150-1 may correspond with a tape reader output TR-1 representative of the most significant bit read from the programmed tape PT whereas a second input to OR gate 150-8 may be considered as an input taken from a tape reader output TR-8 representative of the least significant bit obtained from the programmed tape.

When the output of shift register 844 is at a binary 1 level, this signal is inverted by inverter 852 to clear the four stage counter 854 so that it will be conditioned to commence counting clock pulses received from AND gate 850. The data information corresponding with bit times $b_2$ through $b_9$ for the next character will be loaded into the eight bit shift register 842 in the same manner as described above.

RUN Mode

Figure 8:
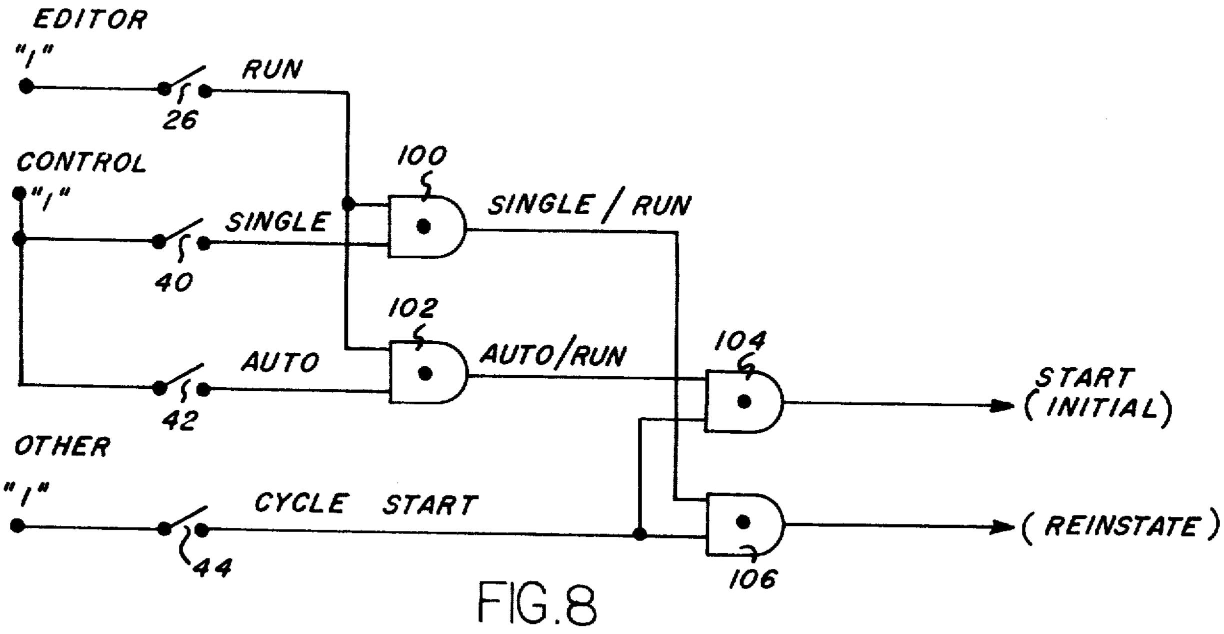
FIG. 8 is a schematic-block diagram illustration of circuitry employed in the RUN mode of operation.

The RUN mode of operation has been described hereinbefore with reference to FIG. 8. As will be recalled, the RUN mode is employed for running the machine from the part program stored on the cassette tape as opposed to that stored on the program tape. With the cassette tape being rewound and the editor run switch 26 being closed, block incrementing of the cassette tape may be accomplished in either the SINGLE or AUTO mode. The machine tool control is actuated to process the data when the CYCLE START pushbutton switch 44 is actuated in the AUTO mode and may be reinitiated by actuation of the CYCLE START pushbutton switch in the SINGLE mode of operation. The cassette tape is read in the manner described above with the reconstructed data obtained being applied through OR gate 150 and thence, to the word buffer and distribution circuit 154 in the same sense as data obtained from the programmed tape. The information is distributed to the various word storage registers such as registers 156 through 164 which serve to supply information to the interpolator control circuitry IC for controlling the machine tool.

OUTPUT Mode

Figure 9:
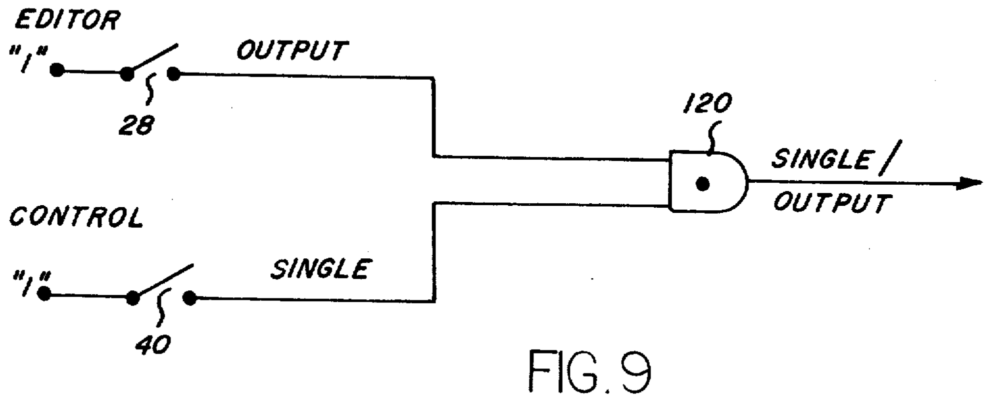
FIG. 9 is a schematic-block diagram illustration of circuitry employed in the OUTPUT mode of operation.

As described previously with reference to FIG. 9, this mode of operation is employed for punching out a finalized part program utilizing the part program stored on the cassette tape CT. To accomplish this the control must be manipulated by the operator to obtain the SINGLE-OUTPUT mode of operation. In the illustration of FIG. 9, this requires actuation of switches 28 and 40. For purposes of simplification, this is represented in FIG. 11 by actuation of a switch 880 which enables an AND gate 882 to read data from the cassette read circuit (FIG. 12) in the same sense as data is read from the cassette tape for verification or for running a machine tool. The data is then supplied to a conventional read and buffer circuit 884 which applies the data to a tape punch control mechanism TP which, in turn, provides a new punched program tape PT'.

Although the invention has been described with respect to preferred embodiments, it is to be appreciated that the invention is not limited thereto as various modifications may occur to those skilled in the art within the scope of the appended claims.

I claim:

1. An editing apparatus for modifying programmed information for use in controlling machine operations and comprising:

- display storage means for receiving and storing a selected data word of a plurality of possible different said data words to be displayed;
- display means for displaying a visual representation of the data word stored by said display storage means;
- a plurality of data word storage means separate from said display storage means for respectively storing an associated one of a like plurality of different said data words;

means for receiving programmed information from a program data source including at least one block of information having at least one data word for storage in an associated one of said data storage means, means for selectively entering a stored data word from a selected one of said data word storage means into said display storage means so as to be displayed by said display means, manual data entry means for entering a new data word for storage in said display storage means;

an auxiliary recording medium, editor control means including means for recording on said recording medium the data words in each block of information provided by said program data source;

said means for receiving said programmed information including means for receiving the recorded information from said recording medium and supplying each said data word in each block for storage in its associated word storage means, said editor control means including means responsive to said data entry means for modifying the data stored on said recording medium in accordance with a new data word entered for storage in said display storage means.

2. An editing apparatus as set forth in claim 1 including means for reading the information on said recording medium, and second means responsive to said reading means for providing an updated program source having blocks of programmed information in accordance with the modifications made on said recording medium.

3. An editing apparatus as set forth in claim 1 wherein said editor control means includes word buffer means for temporarily storing each word in each received block of words in a sequence corresponding to the sequence that said words are received, block buffer means for storing each of said words in a block of said words, and means for sequentially transferring each said word stored from said word buffer means into said block buffer means.

4. An editing apparatus as set forth in claim 3 including means for transferring each said word from said word buffer means into an associated predetermined location in said block buffer means so that when an entire block of words has been loaded into said block buffer means, each word is stored at a predetermined location independently of the order in which the words were received by said word buffer means.

5. An editing apparatus as set forth in claim 4 including means for outputting the data stored by said block buffer means such that a block of said words is outputted in a sequential order in dependence upon said predetermined locations.

6. An editing apparatus as set forth in claim 5 including means for receiving said outputted data from said block buffer means and recording representations thereof on said recording medium so that the information recorded on said recording medium includes the same data blocks of information provided by said program data source.

7. An editing apparatus as set forth in claim 6 including means for recording a selected number of empty blocks on said recording medium with each said selected group of empty blocks being interposed between successive said data blocks recorded on said recording medium so that said recording medium includes a sequence of said data blocks and empty blocks with a selected group of empty blocks being interposed between successive data blocks.

8. An editing apparatus as set forth in claim 7 including means for reading said blocks on said recording medium and supplying the words in each block to said means for receiving programmed data words, said means for receiving said program data words including means for receiving said blocks read from said recording medium and loading the information data for each word in its associated word storage means.

9. An editing apparatus in combination with a machine control which receives blocks of programmed information from a program data source with each block of information including a plurality of command words instructing the machine control to perform various machine control functions, said machine control including a plurality of word storage means for respectively storing associated command words from a said block of information, means for selectively displaying a visual representation of one of said stored command words and including display storage means separate from said word storage means and word selector means for selecting one of said word storage means for supplying data therefrom to said display storage means and visual display means coupled to said display storage means for displaying a visual representation of the selected word, manual data entry means for selectively entering a new word for storage in said display storage means and means for transferring said new word into an associated one of said word storage means; a recording medium, means for recording on said recording medium representations of the information in each block of information provided by said program data source, means for reading said information recorded on said recording medium and supplying it to said machine control a block at a time so that when each block of information is read from said recording medium, each word in said block is stored in its associated word storage means, circuit means for varying the information recorded on said recording medium in response to actuation of said manual data entry means and including circuit means connected to said display storage means for receiving a new word therefrom, said means for recording including means for recording said new word on said recording medium.

10. An editing apparatus as set forth in claim 9, wherein said means for recording includes block buffer means for storing a said block of information with the words in said block being arranged in a predetermined sequence.

11. An editing apparatus as set forth in claim 10 including means for transferring said block of information from said block buffer means with said words being transferred in said predetermined sequence for recordal on said recording medium in said sequence.

12. An editing apparatus as set forth in claim 10, wherein each said command word is a coded word including at least one coded character indicative of the word identity and at least one data character representing command information, means for decoding said coded character for selecting an associated storage location in said block buffer means for the at least one data character.

13. An editing apparatus as set forth in claim 12 including means responsive to said decoding means for addressing said associated storage location in said buffer means for entry of said data character.

* * * * *